J. H. BENNETT.
Butter Worker.

No. 14,530.  Patented March 25, 1856.

UNITED STATES PATENT OFFICE.

JAS. H. BENNETT, OF BENNINGTON, VERMONT.

BUTTER-WORKER.

Specification of Letters Patent No. 14,530, dated March 25, 1856.

*To all whom it may concern:*

Be it known that I, JAMES H. BENNETT, of Bennington, in the county of Bennington and State of Vermont, have invented a new and Improved Implement or Device for Working Butter; and I do hereby declare that the following is a full, clear, and exact description of the same, reference being had to the annexed drawings, making a part of this specification, in which—

Figure 1:
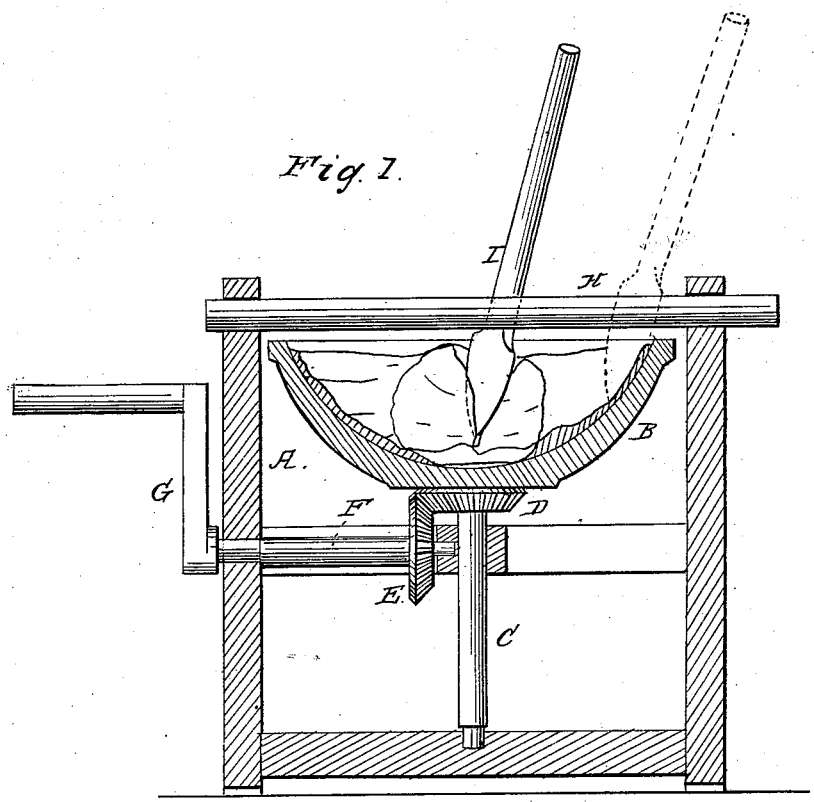
Figure 2:
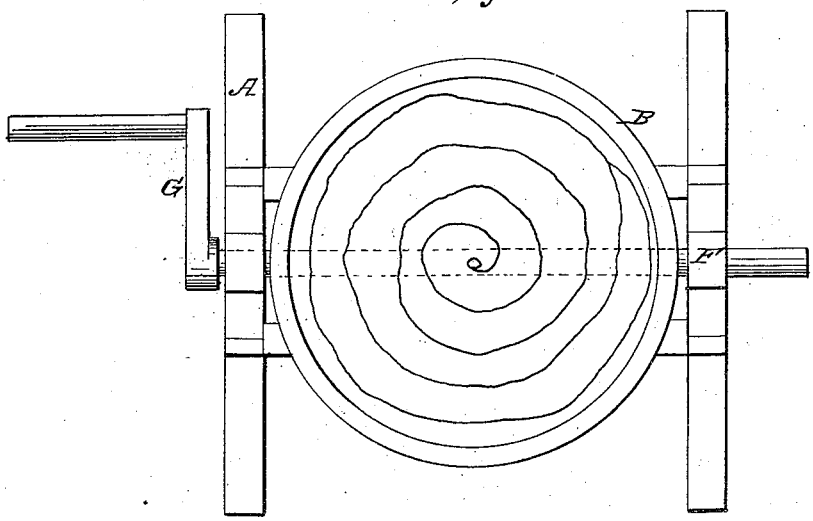

Figure 1, is a vertical section of my improvement, the plane of section being through the center. Fig. 2, is a plan or top view of the same.

Similar letters of reference indicate corresponding parts in the two figures.

My invention consists in the employment or use of a rotary bowl, a horizontal bar, a spatula, combined and arranged as will be hereinafter fully shown and described.

To enable others skilled in the art to fully understand and construct my invention, I will proceed to describe it.

A, represents a framing which may be constructed of wood, and B, represents a wooden bowl which is secured to the upper end of a shaft C. The shaft C, is fitted within the framing A, as shown in Fig. 1, and a bevel wheel D, is attached to the under side of the bowl.

E, is a bevel wheel which gears into the wheel D. The wheel E, is attached to the inner end of a horizontal shaft F, which has its bearings in the framing A. The outer end of the shaft F, has a crank G, attached to it.

H, Fig. 1, is a horizontal bar which is fitted on the upper part of the framing A, said bar being directly over the center of the bowl.

The butter to be worked is placed in the bowl B, with the necessary amount of water and the bowl is rotated by twining the crank G, with one hand. The spatula I, is held with the other hand and placed against the bar H, and the butter is spread out in a thin sheet around the sides of the bowl by moving the spatula from the center of the bowl toward its rim, see red lines the spatula when moved back toward the center of the bowl forces the butter in a lump or ball at the center. By this means the butter will be effectually deprived of butter milk and the bowl may be lifted from the frame when necessary the water emptied and the bowl replaced and supplied with fresh water. Salt may also be well mixed or incorporated with the butter by the above improvement. The bowl may be of any size as circumstances require.

The device is simple and may be manufactured at a small cost. It has been practically tested and operates well.

Having thus described my invention what I claim as new and desire to secure by Letters Patent is,

The rotating bowl, B, in combination with the horizontal bar, H, and spatula, J, when arranged and operated for the purpose herein specified.

JAMES H. BENNETT.

Witnesses:
A. S. MACOMBER,
JOHN SIBLEY.